United States Patent [19]
Hsu

[11] Patent Number: 5,897,708
[45] Date of Patent: Apr. 27, 1999

[54] APPARATUS FOR FORMING A TWO-SIDED FIBERGLASS TAPE MEASURE WITH TWO DIFFERENTLY COLORED NYLON RESIN COATINGS

[76] Inventor: Cheng-Hui Hsu, No.126, Pad Chung Road, Hsin Tien City, Taipei Hsien, Taiwan

[21] Appl. No.: 08/966,304

[22] Filed: Nov. 7, 1997

[51] Int. Cl.⁶ .................................................. B05C 3/02
[52] U.S. Cl. .......................................... 118/420; 118/405
[58] Field of Search ................................. 425/113, 114, 425/378.1, 131.1, 133.5; 118/405, 420, 125, DIG. 18, 65, 67

[56] References Cited

U.S. PATENT DOCUMENTS 5,665,164  9/1997  Milliman .......................... 118/DIG. 18

Primary Examiner—Brenda A. Lamb
Attorney, Agent, or Firm—Pro-Techtor International Services

[57] ABSTRACT

This invention, an apparatus for forming a two-sided fiberglass tape measure with two differently colored nylon resin coatings is characterized in that both sides of a glass fiber tape measure are coated simultaneously on both sides in a single forming step with differently colored resins.

1 Claim, 4 Drawing Sheets

APPARATUS FOR FORMING A TWO-SIDED FIBERGLASS TAPE MEASURE WITH TWO DIFFERENTLY COLORED NYLON RESIN COATINGS

BACKGROUND OF THE INVENTION

This invention relates to an apparatus for forming a two-sided fiberglass tape measure with two differently colored nylon resin coatings, characterized particularly in that an apparatus is used that coats simultaneously both the upper and lower sides of fiberglass tapes, in a single forming step, to produce two differently colored coatings.

A common method for making fiberglass tape measures consists of the following steps: numerous strands of fiberglass yarn, typically 26 strands, are aligned uniformly by means of an aligning device and then baked. After baking, the fiberglass yarn is pulled carefully through a positioning grid into a mold containing 26 holes aligned in a horizontal line. A coating device is used to coat the fiberglass yarn before it is directed into a 13.5 mm wide, 0.5 mm thick forming apparatus where a blank single-colored tape is formed. The tape is then pressed by passing it through rollers and its scale is printed, which essentially completes the fabrication process. However, as is well known, tape measures have scales on both sides, a metric scale on one side and a standard scale on the other. As the inventor of this new method, I faced the fact that the conventional technology was inadequate and in need of innovation and my aim, therefore, was to produce a two-sided fiberglass tape having two distinctive colors, while overcoming the technical limitations imposed by the traditional method of producing fiberglass tape measures coated with a nylon resin of a single color.

In the course of developing the invented product, I performed many tests and made many improvements in order to arrive at the most effective process. In time, due to my persistence, the Apparatus for forming a two-sided fiberglass tape measure with two differently colored nylon resin coatings was developed.

The aim of the invention was to provide a method for making a two-sided fiberglass tape measure with two differently colored nylon resin coatings, so that each side of the tape measure would have its own distinctive color, while simultaneously overcoming the limitations of the traditional method of making fiberglass tape measures coated with a nylon resin of a single color.

A description of the production method, accompanied by flow diagrams, is provided to make it easier for your examiner to understand the features and advantages of this invention.

DESCRIPTION OF THE PREFERRED EMBODIMENT

Figure 1:
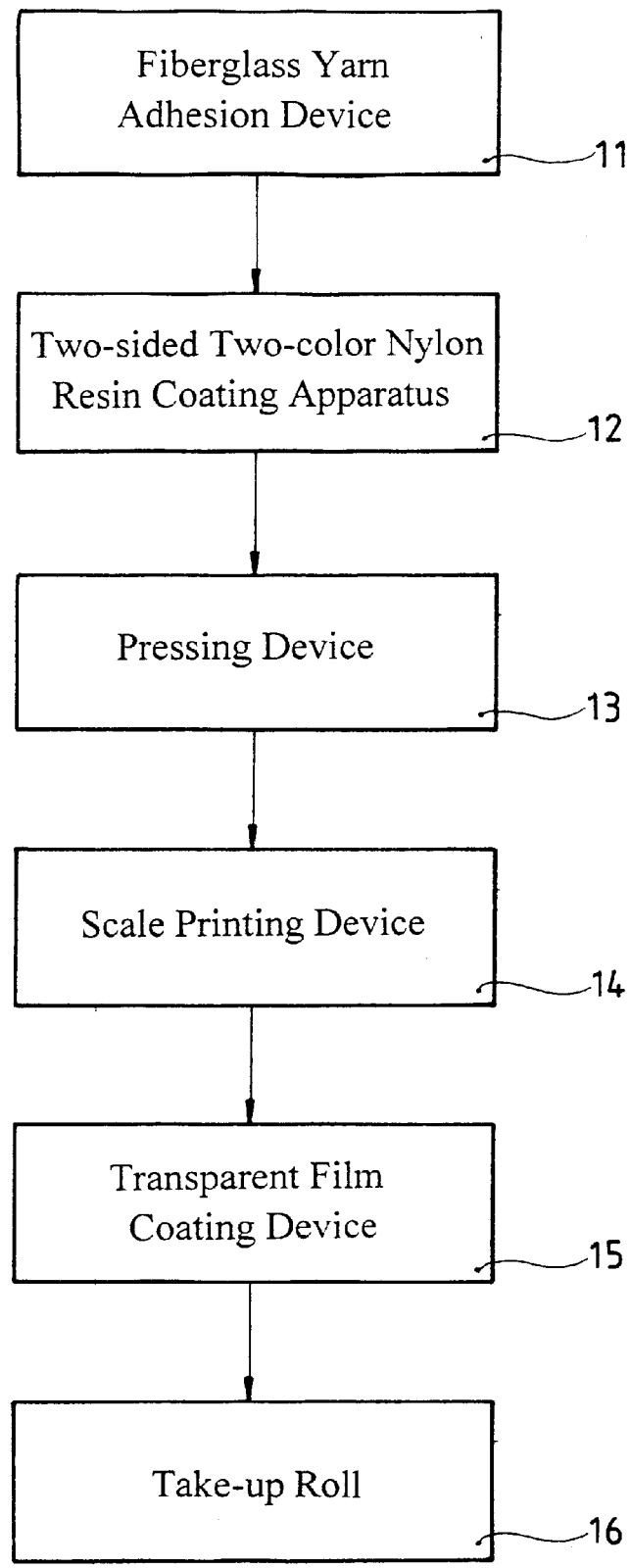
FIG. 1 shows the principal elements of the apparatus.
Figure 2:
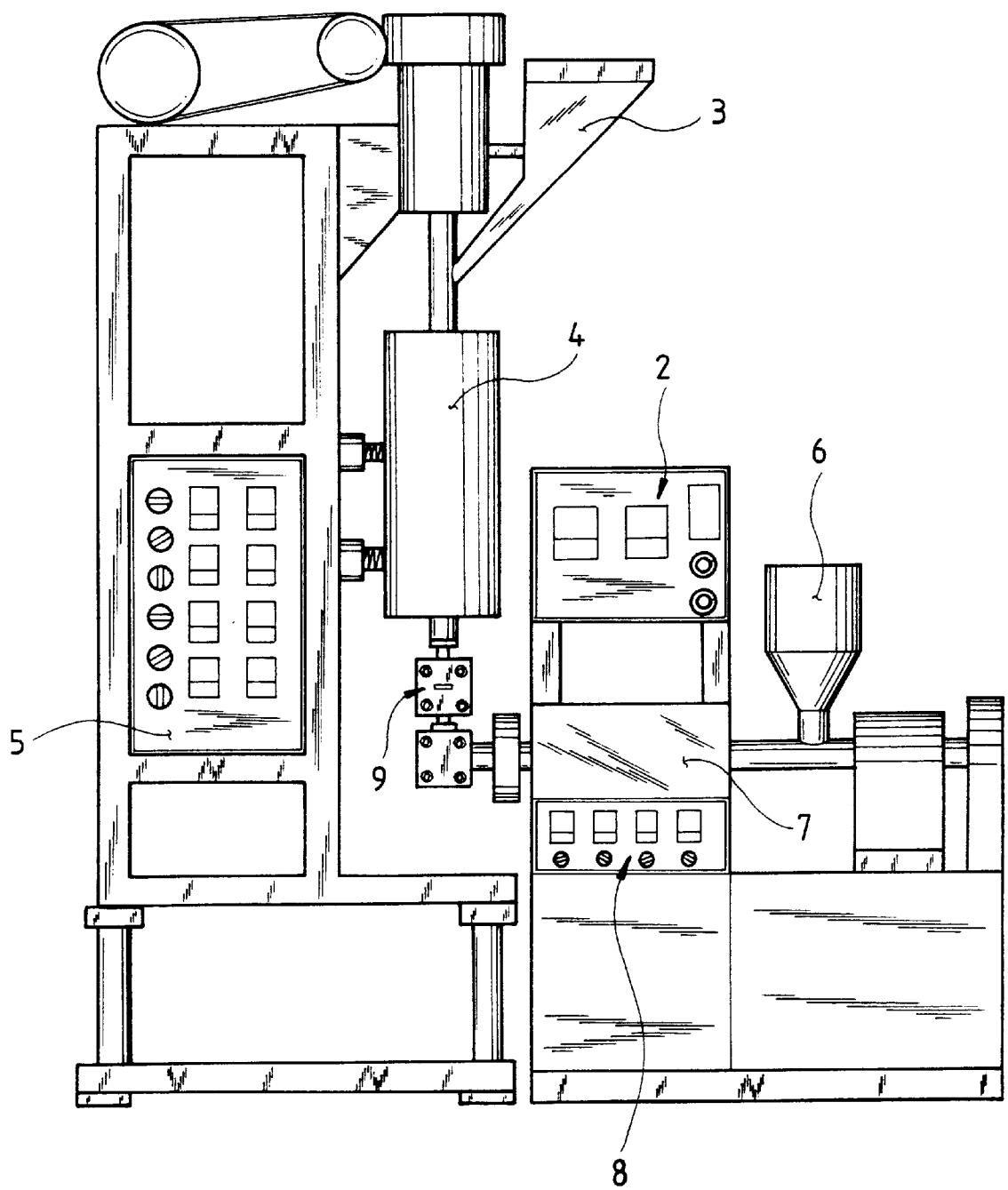
FIG. 2 shows the structural diagram of the apparatus for coating two differently colored nylon resins.

As we look at FIG. 1, we see that the Apparatus for forming a two-sided fiberglass tape measure with two differently colored Resin coatings consists of: a fiberglass yarn adhesion device (11), a two-sided two-color nylon resin coating device (12), a press (13), a scale-printing device (14), a transparent film coating device (15), and a take-up roll (16), etc. FIG. 2 shows the two-sided two-color nylon resin coating device (12), representing the main element of this invention, a speed-control device (2) which controls the rates at which the two differently colored nylon resin materials are processed. A single-color nylon resin material in solid particulate form is fed through feeding funnel (3) into a heating device (4). By using the temperature control device (5), the solid particles of the nylon resin are softened in the heating device (4) to a fluid consistency. A nylon resin material of a different color is then softened in heating device (7), again by using the temperature control device (8) to a fluid consistency. The two differently colored nylon resins materials are then fed separately into the top and bottom of the forming device (9) to allow the fiberglass tape to be coated simultaneously with two differently colored nylon resins.

The main components of the apparatus according to this invention are: the main body of the forming apparatus (91), positioning blocks (92) and (93), a wedge-shaped duct block (94) and heating plates (95), (96), (97), (98), etc.

Figure 3:
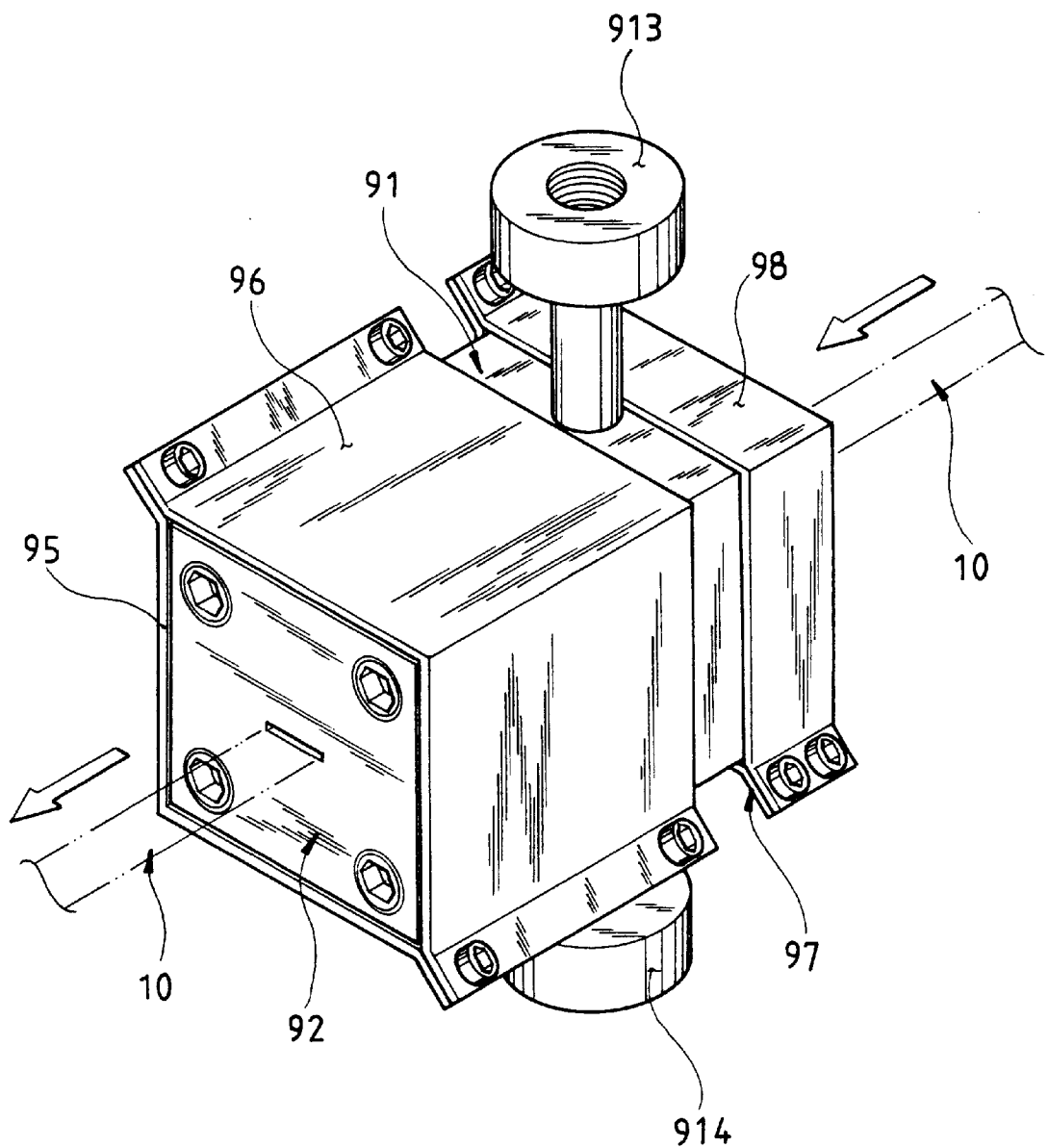
FIG. 3 is a drawing of the assembled forming apparatus.
Figure 4:
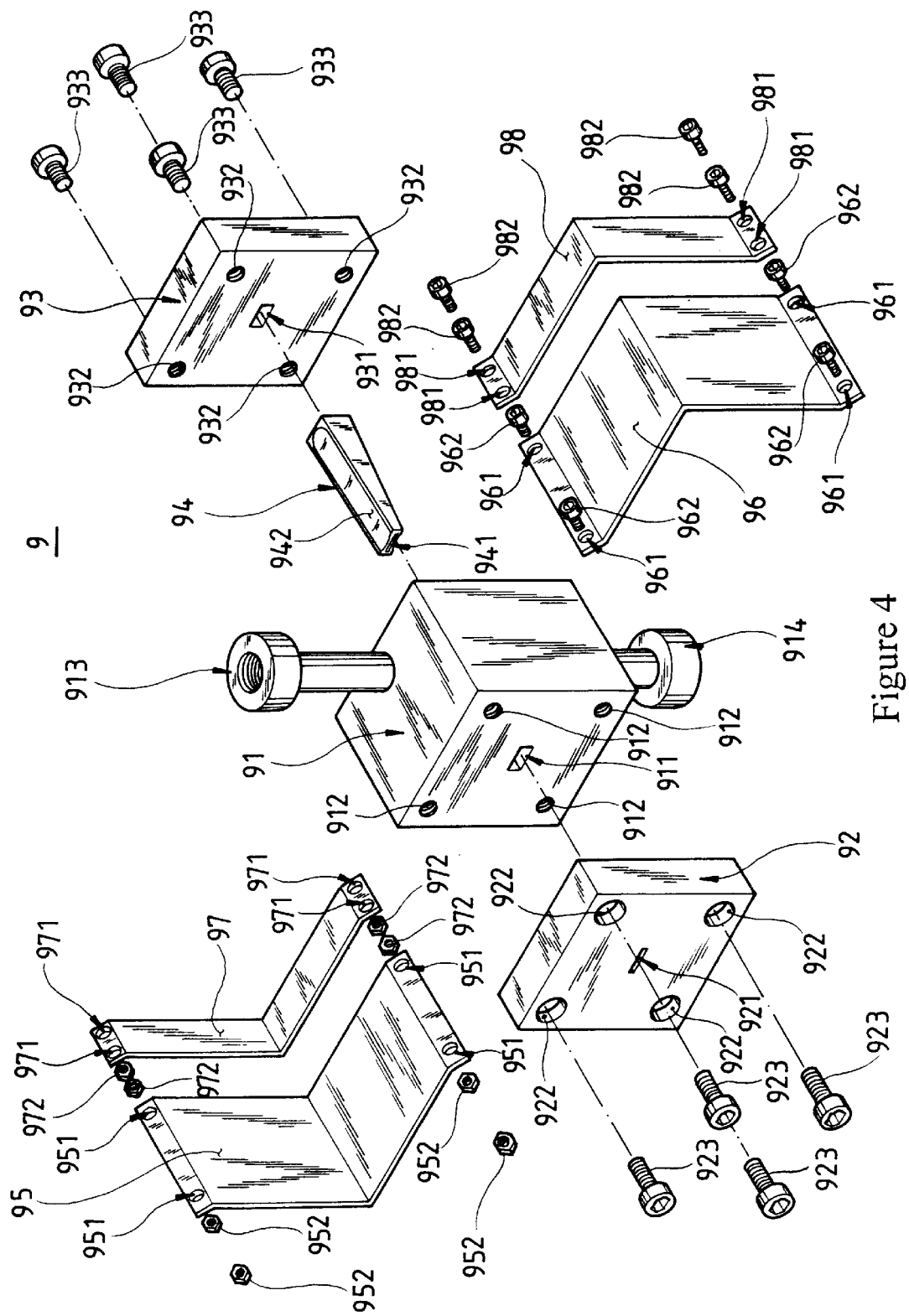
FIG. 4 shows a three-dimensional dissection diagram of the forming apparatus.

FIG. 3 and 4 show the forming device as cubic, with a horizontal reducing wedge channel (911) in its center. Four threading holes (912) are located both in the front and in the back of the forming device's main body (91), with two nylon resin feed pipes connected to the top and bottom of the device, respectively.

The wedge duct block (94) is a long conical wedge-shaped unit, with a horizontal reducing wedge channel (911) located at its center. A slightly concave channel (942) fits on both the top and bottom of the duct block.

Positioning block (92) is rectangular, with a long linear channel (921) through its center. The outside of the block has four socket head screw holes (922).

Positioning block (93) is rectangular, with a long linear channel (931) through its center. The outside of the block has four socket head screw holes (932).

Heating plate (95), is L-shaped, with a hole on either side (951).

Heating plate (96), is L-shaped, with a hole on either side (961).

Heating plate (97), is L-shaped, with a hole on either side (971).

Heating plate (98), is L-shaped, with a hole on either side (981).

The wedge duct block is inserted into the wedge channel (911) in the center of the main body of the forming device (91). Four hexagonal screws are inserted into the screw holes (922) on the positioning block (92) which is then fastened through screw hole (912) into one side of the main body (91). Likewise, four hexagonal screws (933) are then inserted into the screw holes (932) on the positioning block (93) and fastened through the screw hole (912) to the other side of the main body (91). The main body of the forming device (91) is then covered with heating plates (95) and (96), four hexagonal screws (962) are inserted into holes (951) and (961) on the heating plates (95) and (96) and fastened to them by means of nuts (952). The exterior of the forming device's main body is then covered with heating plates (97) and (98), four hexagonal screws (982) are inserted into the holes (971) and (981) in plates (97) and (98), fastened by means of nuts (972) in order to form a one-piece unit.

A fiberglass tape (10) is placed into the forming apparatus of this invention, in the direction of the arrow indicated in FIG. 3. Feed a nylon resin of one color through the feed pipe (913) on top of the forming device's main body (91) through the channel of the wedge-shaped duct block (94), as shown in FIG. 4. Similarly, feed a differently colored resin through the bottom feed pipe (914) into the channel of the wedge-shaped duct block (94). After the main body of the forming device (91) and the positioning block (92) have been assembled, a crevice is formed between them. When the fiberglass tape (10) is introduced through channel (941) in the wedge-shaped block (94) into the crevice between the forming channel (921) on the positioning block (92) and the forming device (91), two differently colored nylon resins are coated simultaneously onto the tape. The forming channel (921) on the positioning block controls the thickness and width of the nylon resin coats on the glass fiber tape (10). This completes the process.

I claim:

1. Apparatus for forming a two-sided fiberglass tape measure with two differently colored nylon resin coatings comprised of the following elements: a main body (91), two positioning blocks (92) and (93), a wedge duct block (94) and heating plates (95), (96), (97), (98);

the main body (91) is cubic, with a horizontal reducing wedge channel (911) in its center; four threading holes (912) are located both in the front and in the back of the main body (91), with two nylon resin feed pipes connected to the main body, with one of the nylon resin feed pipes connected to the top of the main body and the other of the nylon resin feed pipes connected to the bottom of the main body;

the wedge duct block (94) is a long conical wedge unit, with a horizontal reducing wedge channel (941) located at its center; and a slightly concave channel (942) formed on both top and bottom of the duct block;

the positioning block (92) is rectangular, with a long linear channel (921) through its center and a plurality of socket head screw holes (922);

the positioning block (93) is rectangular, with a long linear channel (931) through its center and a plurality of socket head screw holes (932);

heating plate (95), is L-shaped, with a hole (951) at each of its top end and bottom end corners;

heating plate (96), is L-shaped, with a hole (961) at each of its top end and bottom end corners;

heating plate (97), is L-shaped, with a hole (971) at each of its top end and bottom end corners;

heating plate (98), is L-shaped, with a hole (981) at each of its top end and bottom end corners;

the duct block is inserted into the wedge channel (911) in the center of the main body (91); four hexagonal screws (923) are inserted into the screw holes (922) on the positioning block (92) which is then fastened through screw hole (912) into one side of the main body (91) and likewise, four hexagonal screws (933) are then inserted into the screw holes (932) on the positioning block (93) and fastened through the screw hole (912) to the other side of the main body (91) to form a composite unit; a portion of the composite unit which includes the main body (91) is then covered with heating plates (95) and (96), four hexagonal screws (962) are inserted into holes (951) and (961) on the heating plates (95) and (96) and fastened to them by means of nuts (952); another portion of the composite unit which includes main body (91) is then covered with heating plates (97) and (98), four hexagonal screws (982) are inserted into the holes (971) and (981) in respectively heating plates (97) and (98), fastened by means of nuts (972); whereby the two differently colored nylon resin coating material are simultaneously applied onto the respective sides of the two-sided fiberglass tape as it moves through the composite unit.

* * * * *